Feb. 26, 1929.                         1,703,660
H. F. DAVIS
MOVABLE FLY NET
Filed Feb. 1, 1927
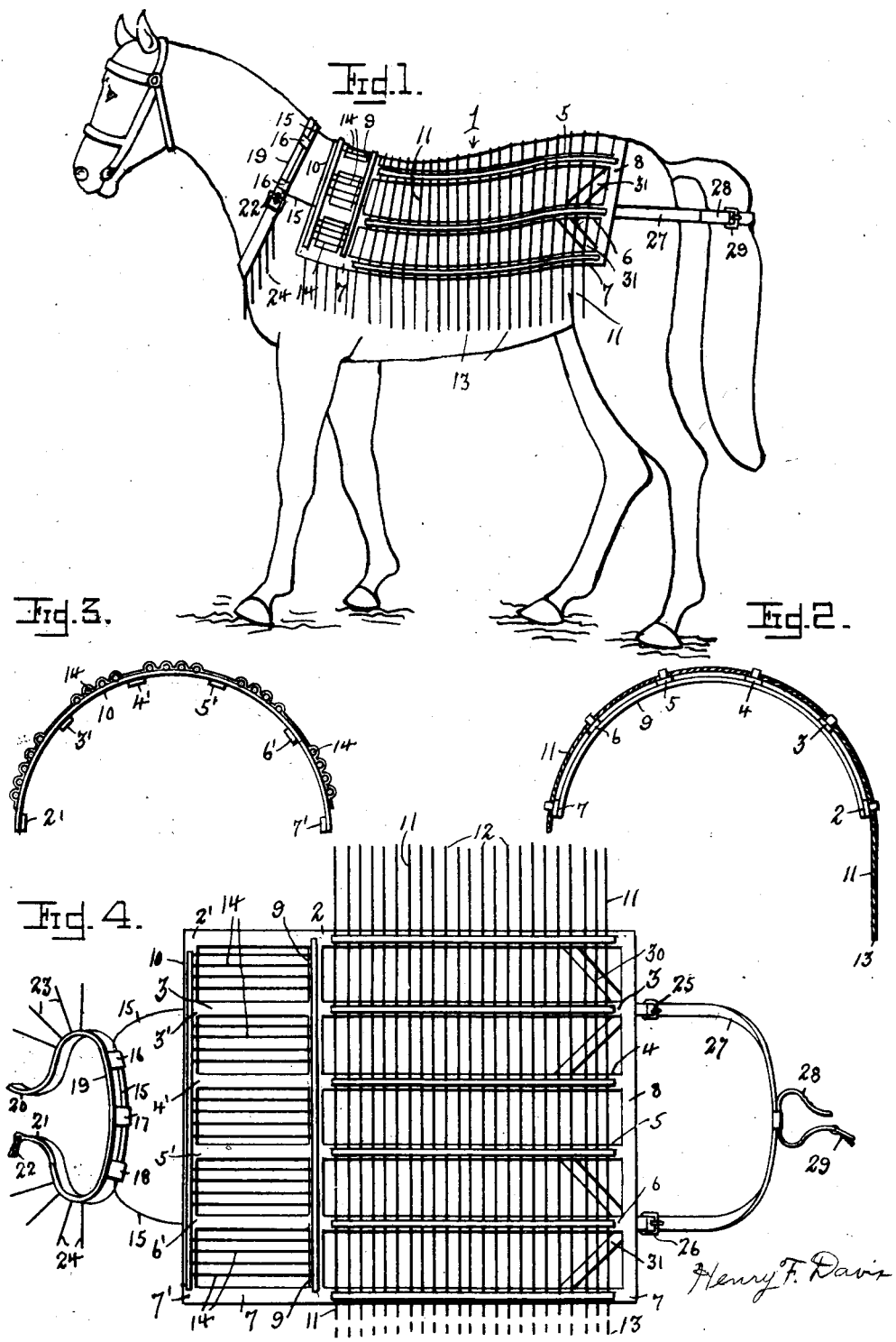

Patented Feb. 26, 1929.

1,703,660

UNITED STATES PATENT OFFICE.

HENRY F. DAVIS, OF WALTERS, OKLAHOMA, ASSIGNOR TO GEORGE B. SMITH, OF LAWTON, OKLAHOMA.

MOVABLE FLY NET.

Application filed February 1, 1927. Serial No. 165,221.

This invention relates to improvements in fly nets and has for its object to provide a fly net for horses having means whereby the net will be caused to move backward and forward upon the horse to brush off flies.

Another object of the invention is to provide in a fly net means whereby movement of the neck of the horse will cause a movement of the entire net.

Another object of the invention is to provide in a fly net, means attached to the tail of the horse whereby movement of the tail will cause movement of the entire fly net.

With the above and such other objects in view as may hereinafter more fully appear, I have invented the fly net shown in the accompanying illustration, in which:

Figure 1 is a side elevational view of my device as applied to a horse;

Figure 2 is a rear elevational view thereof;

Figure 3 is a front, elevational view thereof;

Figure 4 is a plan view of the device removed from the horse.

Like reference characters indicate like parts throughout the following specification, and in the several views in the drawings in which 1 indicates an improved fly net for horses, which consists of a series of six parallel straps 2, 3, 4, 5, 6, and 7, connected at their rear end to a transverse strap 8, and at their forward end to a transverse strap 9, said straps 2 to 7 being continued beyond the strap 9, and to the front end strap 10, as at 2', 3', 4', 5', 6', and 7'. Connecting the straps 2 to 7, are a series of transverse cords 11, which are relatively close together so that upon the backward movement of the device upon the horse, the whole upper portion of the body will be engaged by said net to brush any flies off of the horse; this backward and forward movement being provided for and will be presently explained.

The ends 12 and 13 of the cords 11, project considerably below the straps 2 to 7, and swing freely so as to flap under the body of the horse with the movement of its body.

The straps 9 and 10 are connected by a series of relatively closely connected cords 14. Connecting the terminals of the straps 3' and 6' is a loop cord 15, upon which is loosely threaded the small loops 16, 17, and 18 fixed on the neck band 19, the terminals 20 and 21 of said neck band being adjustably connected by a buckle 22. Dangling from the forward ends of the strap 19, are cords 23 and 24, which are adapted to flap against the breast of the horse. Connected to the rear terminals of the straps 3 and 6, by buckles 25, and 26, is a breeching 27, to the central portion of which is a tail strap 28, adapted to be tightly fastened around the tail of the horse by means of the buckle 29. The movement of the horse in walking will cause its rear legs to force the rearward movement of the breeching, and the neck straps connected thereto. This tail strap 28, is far enough down upon the tail of the horse so that in switching the same the entire fly net will be drawn rearwardly for a short distance, and upon the movement of the tail back to its normal position, the action of the neck band, through the movement of the horse's neck, will tend to draw the net forward. Thus a constant backward and forward movement of the fly net upon the back of the horse is provided for, and through such movement the entire surface of the main body of the horse will be kept brushed free of flies.

Brace straps 30 and 31 connect the rear ends of the straps 2 and 6, with the adjoining upper and lower straps.

Having described my invention that which I claim to be new, and desire to procure by Letters Patent is:

In a horse fly net, means whereby the same will be caused to move backward and forward upon the horse, said means including a neck band connected to said fly net, a breeching connected to said fly net, and a tail strap connected to said breeching.

In testimony whereof I affix my signature.

HENRY F. DAVIS.